(12) United States Patent
Fregly et al.

(10) Patent No.: US 11,706,036 B2
(45) Date of Patent: Jul. 18, 2023

(54) SYSTEMS AND METHODS FOR PRESERVING PRIVACY OF A REGISTRANT IN A DOMAIN NAME SYSTEM ("DNS")

(71) Applicant: VeriSign, Inc., Reston, VA (US)

(72) Inventors: Andrew Fregly, Reston, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 17/682,957

(22) Filed: Feb. 28, 2022

(65) Prior Publication Data
US 2022/0182245 A1 Jun. 9, 2022

Related U.S. Application Data

(62) Division of application No. 15/664,612, filed on Jul. 31, 2017, now Pat. No. 11,283,624.

(51) Int. Cl.
| | |
|---|---|
| *H04L 9/32* | (2006.01) |
| *H04L 9/14* | (2006.01) |
| *H04L 9/30* | (2006.01) |
| *H04L 9/40* | (2022.01) |
| *H04L 67/02* | (2022.01) |

(Continued)

(52) U.S. Cl.
CPC ............ *H04L 9/3263* (2013.01); *H04L 9/14* (2013.01); *H04L 9/30* (2013.01); *H04L 9/3247* (2013.01); *H04L 61/302* (2013.01); *H04L 61/4511* (2022.05); *H04L 63/0823* (2013.01); *H04L 67/02* (2013.01); *H04L 67/52* (2022.05); *H04W 4/02* (2013.01); *H04L 2101/618* (2022.05)

(58) Field of Classification Search
CPC ............ H04L 2101/618; H04L 61/302; H04L 61/4511; H04L 63/0823; H04L 67/02; H04L 67/52; H04L 9/14; H04L 9/30; H04L 9/3247; H04L 9/3263; H04W 4/02
See application file for complete search history.

(56) References Cited

U.S. PATENT DOCUMENTS

| | | | |
|---|---|---|---|
| 6,023,698 A | 2/2000 | Lavey, Jr. | |
| 8,312,660 B1 * | 11/2012 | Fujisaki | F41A 17/08 455/457 |

(Continued)

FOREIGN PATENT DOCUMENTS

WO     2017/122123 A1    7/2017

OTHER PUBLICATIONS

T. Geurts, "EU GDPR and the WHOIS. Radiation Fallout", Mar. 26, 2017, pp. 1-3. XP055529496.

(Continued)

*Primary Examiner* — Gary S Gracia
(74) *Attorney, Agent, or Firm* — McCarter & English, LLP; Michael A. Sartori

(57) ABSTRACT

A method and a computer system is provided for executing the method for providing a registration data directory service (RDDS). The method includes obtaining, at a RDDS, a RDDS query comprising a location assertion from a RDDS client from a RDDS client; providing, by the RDDS, a request for personally identifying information (PII) for the RDDS query from a privacy provider, wherein the request comprises the location assertion; obtaining, by the RDDS, the PII for the RDDS query; and providing, by the RDDS, a response to the RDDS query to the RDDS client, wherein the response comprises PII.

24 Claims, 10 Drawing Sheets

(51) Int. Cl.
  *H04L 61/3015* (2022.01)
  *H04W 4/02* (2018.01)
  *H04L 61/4511* (2022.01)
  *H04L 67/52* (2022.01)
  *H04L 101/618* (2022.01)

(56) References Cited

U.S. PATENT DOCUMENTS

| | | | | |
|---|---|---|---|---|
| 8,676,273 | B1 * | 3/2014 | Fujisaki | H04M 1/724 |
| | | | | 455/418 |
| 9,032,498 | B1 * | 5/2015 | Ben Ayed | G06F 21/35 |
| | | | | 726/9 |
| 9,262,771 | B1 * | 2/2016 | Patel | G06Q 30/0237 |
| 9,473,520 | B2 * | 10/2016 | Dixon | H04L 63/1416 |
| 9,742,723 | B2 * | 8/2017 | Orentas | H04L 61/5007 |
| 10,510,085 | B2 * | 12/2019 | Itani | G06Q 30/01 |
| 11,501,059 | B2 * | 11/2022 | Baysinger | G06F 16/9535 |
| 2005/0138144 | A1 | 6/2005 | Sethi | |
| 2006/0168020 | A1 | 7/2006 | Brennan | |
| 2007/0083535 | A1 * | 4/2007 | Zilliacus | G06F 16/9577 |
| 2007/0262860 | A1 | 11/2007 | Salinas | |
| 2008/0033646 | A1 | 2/2008 | Morgan et al. | |
| 2010/0153011 | A1 * | 6/2010 | Obrea | G06F 21/64 |
| | | | | 380/258 |
| 2011/0087887 | A1 * | 4/2011 | Luft | H04W 12/10 |
| | | | | 713/178 |
| 2011/0173089 | A1 | 7/2011 | Tan | |
| 2012/0173565 | A1 * | 7/2012 | Jacobs | G06F 16/951 |
| | | | | 707/769 |
| 2012/0311684 | A1 | 12/2012 | Paulsen | |
| 2014/0108129 | A1 * | 4/2014 | Klein | G06Q 30/02 |
| | | | | 705/14.45 |
| 2014/0122476 | A1 | 5/2014 | Kaliski, Jr. | |
| 2014/0123301 | A1 | 5/2014 | Kaliski, Jr. | |
| 2015/0242511 | A1 | 8/2015 | Arians | |
| 2015/0244557 | A1 * | 8/2015 | Deng | H04W 12/06 |
| | | | | 455/456.1 |
| 2016/0189193 | A1 | 6/2016 | Toumayan | |
| 2016/0260039 | A1 | 9/2016 | Irving | |
| 2016/0277192 | A1 | 9/2016 | Kaliski, Jr. | |
| 2016/0299912 | A1 * | 10/2016 | Acuna | H04L 43/0876 |
| 2016/0301680 | A1 | 10/2016 | Main | |
| 2017/0195286 | A1 | 7/2017 | Stahura | |
| 2017/0262651 | A1 | 9/2017 | Kaliski, Jr. | |
| 2017/0279762 | A1 | 9/2017 | Fregly | |
| 2018/0101672 | A1 * | 4/2018 | George | G06F 21/54 |
| 2018/0224291 | A1 * | 8/2018 | Tuukkanen | H04W 12/06 |
| 2018/0309836 | A1 * | 10/2018 | Carpenter | H04L 67/025 |
| 2019/0014107 | A1 * | 1/2019 | George | H04L 67/146 |
| 2019/0036708 | A1 * | 1/2019 | Fregly | H04L 9/3263 |
| 2020/0082402 | A1 * | 3/2020 | Patel | G06Q 20/405 |
| 2022/0245241 | A1 * | 8/2022 | Miller | G06F 21/552 |

OTHER PUBLICATIONS

Extended European Search Report dated Dec. 17, 2018, EP Application No. 18 18 5211, pp. 1-8.

* cited by examiner

SYSTEMS AND METHODS FOR PRESERVING PRIVACY OF A REGISTRANT IN A DOMAIN NAME SYSTEM ("DNS")

FIELD

The present disclosure relates generally to preserving privacy of a registrant in DNS.

BACKGROUND

The Domain Name System ("DNS") is the part of the Internet infrastructure that translates human-readable domain names into the Internet Protocol ("IP") numbers needed to establish TCP/IP communications over the Internet. That is, DNS allows users to refer to web sites, and other resources, using easier to remember domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" ("TLD"). Examples of well-known TLDs are ".com"; ".net"; ".org." etc. Each TLD supports second-level domains, listed immediately to the left of the TLD, e.g., "example" in "www.example.com." Each second-level domain can include a number of third-level domains located immediately to the left of the second-level domain, e.g., "en" in "www.en.example.com." There can be additional level domains as well. For example, a domain with additional domain levels could be www.landscape.photos.example.com.

It should be noted that a single IP address, e.g., a single server, can support numerous domain names. That is, different domain names may resolve to the same server, that can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part is a sequence of segments separated by a forward slash ("/"). This information may be included immediately to the right of the domain name, such as the "blog" in "www.example.com/blog/today.htm," and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page.

The Internet Corporation for Assigned Names and Numbers ("ICANN") is responsible for managing the assignment of domain names and IP addresses. The responsibility for operating each TLD is delegated by ICANN to an organization known as a domain name registry operator ("registry"). For example, VeriSign, Inc. is the registry operator for the ".com" TLD. Each registry operator maintains a registry database of all domain names registered in a top-level domain for which it is responsible. A registry database record can map a domain name to an IP address of a name server. When a domain name query is submitted to the registry, the registry returns the IP address of the name server, which can contain another record with further address information about the Internet resource that corresponds to the queried domain name. The process of responding to a domain name query with an IP address is called "resolving" the domain name.

The actual registration of domain names is performed by companies referred to as domain name registrars ("registrars"). Registrars register domain names with registries. For example, an end user submits to a registrar a domain name for registration and provides an IP address to which the domain name should resolve. The registrar communicates with the registry to create a registry database record that can be used to resolve the domain name to the IP address provided by the end user and indicates the identity of the registrar through which the domain name was registered. Except for the expiration of the domain name registration at the registry, only the registrar designated in the domain name record at the registry can modify or delete registry database information about a domain name. An end user can switch registrars by following certain domain transfer procedures.

A zone file is a text file that describes a portion of the DNS called a DNS zone. A zone file is organized in the form of resource records ("RR") and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live ("TTL"), the class (which is almost always "IN" for "internet" and rarely included), the type of resource record (A, MX, SOA, etc.), followed by type-specific data such as the IPv4 address for A records. Comments can be included by using a semi-colon and lines can be continued by using parenthesis. There are also file directives that are marked with a keyword starting with a dollar sign.

A Whois system is a query/response protocol that is used for querying a database in order to determine the owner of a domain name, an IP address, or an autonomous system number on the Internet. Traditionally, Whois lookups were made using a command line interface. However, several simplified web-based tools currently exist for looking up domain ownership information using the Whois system. Typically, when a user queries the Whois system, a web-based Whois client will utilize the Whois protocol to connect to a Whois server. Lookups of the requested information will then be returned to the user. The Whois system provides a number of useful functions including providing contact information for network operators and administrators. Additionally, using the Whois system, a user is able to determine the availability of a particular domain name. Registration data access protocol ("RDAP") is a next generation replacement for Whois and is specified in a suite of Internet Request for Comments ("RFC") documents. RFC 7480—HTTP Usage in the Registration Data Access Protocol ("RDAP"); RFC 7481—Security Services for the Registration Data Access Protocol ("RDAP"); RFC 7482—Registration Data Access Protocol ("RDAP") Query Format; RFC 7483—JSON Responses for the Registration Data Access Protocol ("RDAP"); RFC 7484—Finding the Authoritative Registration Data ("RDAP") Service; and RFC 7485—Inventory and Analysis of WHOIS Registration Objects.

In a typical domain name registration example, a registrant may want to reserve the domain name "example.com." The registrant would contact a registrar that has a business relationship with the registry that operates the .com TLD. The registrant would query the registrar as to the availability of the domain name "example" in the ".COM" namespace. The registrar in turn would query the proper registry through the EPP, and then return the results to the registrant. The registrant may then obtain a registration of the domain name by paying a registration fee and providing information required by the registry and registrar. The registry charges the registrar for the domain name registration and the registrar collects the registration fee from the registrant.

The registrar has a relationship with both the registrant and the registry, but the registry only has a direct relationship with the registrar. The registry can be a "thin registry," storing no information about the registrant, or a "thick registry," storing contact or other information about the registrant. Any information stored about the registrant may be obtained through the registrar. Thus, from the registry's perspective, the owner of the domain is the registrar.

Thick Whois providers, such as registrars, are required by ICANN to collect and store personal information from registrants. This personal information may later be exposed by services, such as thick Whois, to requesting parties that in some jurisdictions, i.e., the EU, may be considered private and therefore should not be exposed. This is a requirement in registrar and registry agreements with ICANN. These requirements are currently in conflict with EU law that prevents the disclosure of personally identifying data except in specific circumstances. EU law also restricts storage of personal information outside the EU to localities that have gone through a process to be granted the right to store EU personal information. "Safe Harbor" laws and classification of organization within a country or countries as not being safe harbor limit areas where personal information can legally be stored. The EU ruled in late 2015 that the U.S. was no longer considered a safe harbor for organizations to store private information for EU citizens. Safe harbor organizations include both organizations that are legally recognized by the jurisdiction of the registrant as safe harbor and organizations in jurisdictions that do not need special provisions to store the private information of the registrant, such as organizations in the EU that store private information of EU citizens. The EU has since created a new process by which U.S. organizations can gain the right to store private information for EU citizens, but the costs and audit requirements of this process make it questionable as to how many U.S. organizations will want to go through the process. The conflicting legal and ICANN contractual requirements for storage and exposure of Thick Whois data are a challenge for Thick Whois providers and may be a problem for RDAP providers as it is phased in to replace Thick Whois.

Thus, there is need for systems and method to provide Thick Whois or RDAP services that overcome the aforementioned problems.

SUMMARY

According to examples of the present disclosure, a method of registering a device that provides location assertions is provided. The method comprises loading a web browser on the device; and directing the web browser to a web assertion service, wherein the web browser provides a cryptographic credential for verifying a location assertion from the device in a device registration request to the web assertion service.

In some examples, the credential comprises a user identifier and a public key associated with the device, wherein the credential is digitally signed with a private key that is associated with the public key. In some examples, the credential is a X.509 certificate.

According to examples of the present disclosure, a method of generating a location assertion is provided. The method comprises obtaining, at a user device, a web page comprising a location reporting application from a web assertion service; activating the web page by a user action on a web browser stored on the user device; authenticating, by the location reporting application, the user using a trusted on-device authentication service; requesting, by the location reporting application, a current location for the user from a trusted location service stored on the user device; obtaining, by the location reporting application, the current location; requesting, by the location reporting application, a current time from a trusted time service; obtaining, by the location reporting application, the current time; generating, by the location reporting application, a location assertion, wherein the location assertion comprises information related to the current location and the current time; digitally signing, by the location reporting application, the location assertion using a cryptographic digital signature protocol; providing, by the location reporting application, the location assertion and a cryptographic credential previously obtained from the web assertion service during registration to the web assertion service, wherein the cryptographic credential comprises data related to a location assertion service provided by the web assertion service.

According to examples of the present disclosure, a method for providing a registration data directory service ("RDDS") is provided. The method comprises obtaining, at a domain name system ("DNS") registry, a DNS registration request for a domain name from a user device that has been previously registered with a location assertion service; providing, by the DNS registry, a request for a location assertion from the user device; obtaining, by the DNS registry, the location assertion from the user device; providing, by the DNS registry, the location assertion to a privacy provider based on location information in the location assertion; and providing, by the DNS registry, personally identifying information ("PII") to a RDDS.

In accordance with examples of the present disclosure, a method for providing a registration data directory service ("RDDS") is provided. The method comprises obtaining, at a RDDS, a RDDS query comprising a location assertion from a RDDS client from a RDDS client; providing, by the RDDS, a request for personally identifying information ("PII") for the RDDS query from a privacy provider, wherein the request comprises the location assertion; obtaining, by the RDDS, the PII for the RDDS query; and providing, by the RDDS, a response to the RDDS query to the RDDS client, wherein the response comprises PII. In some examples, the method can further comprise determining, by the RDDS, that the PII is needed in responding to the RDDS query. In some examples, the method can further comprise providing, by the RDDS, the location assertion and the PII to a privacy provider. In some examples, the PII is encrypted by the privacy provider. In some examples, the PII is encrypted by the RDDS.

In accordance with examples of the present disclosure, a method of providing thick WHOIS service using location assertions is provided. The method comprises obtaining, at a web WHOIS service, a WHOIS request from a user device; providing, by the web WHOIS service, a location reporting application in a web page to the user device; obtaining, at the web WHOIS service, a location assertion and a computer-executable code from the user device; verifying, by the web WHOIS service, that the location assertion is authentic; and providing, by the web WHOIS service, an answer to the WHOIS request. In some examples, the verifying comprises verifying the computer-executable code and verifying a digital signature on the location assertion using a registered public key of the user device.

In accordance with examples of the present disclosure, a method for providing authentication services in a registration data directory service ("RDDS") is provided. The method comprises obtaining, by an authentication service, a query originating from a user from a RDDS web client; obtaining, by the authentication service, a user device identifier that the user uses to generate a location assertion; providing, by the authentication service, an uniform resource locator ("URL") for the authentication service to the user device, wherein the URL is used to launch a trusted location reporting application on the user device; obtaining, at the authentication service, a location assertion and a cookie from the user device; verifying, by the authentication service, that the location assertion and cookie is authentic; and providing, by the authentication service, an authentication token with a location claim to the user device, the RDDS web client, or both.

In accordance with examples of the present disclosure, a method for selective encryption for virtual thick registration data directory service ("RDDS") using verifiable location assertions is provided. The method comprises obtaining, at a RDDS web client, a RDDS request from a user, wherein the RDDS request comprises a verifiable location assertion contained within an authentication token provided by an authentication service and an indicator for a RDDS service to perform selective encryption on personally identifying information ("PII"); providing, by the RDDS web client, the RDDS request to the RDDS service; obtaining, by the RDDS web client, an answer to the RDDS request that conforms to information contained within the authentication token, and providing the answer to the user. In some examples, the answer is consolidated with other answers that are provided to the user. In some examples, at least a portion of the answer is encrypted. In some examples, the method can further comprise decrypting the answer by the RDDS web client before providing the answer to the user. In some examples, the answer further comprises one or more processing indicators that describe how the PII was processed by the RDDS service. In some examples, the PII stays encrypted during transport and processing by the RDDS service.

According to examples of the present disclosure, a computer-implemented method for providing a registration data directory service (RDDS) is provided. The method comprises obtaining, at a RDDS, a RDDS query comprising a location assertion from a RDDS client; determining, by the RDDS, that personally identifying information (PII) is needed in responding to the RDDS query; providing, by the RDDS, a request for PII for the RDDS query from a privacy provider, wherein the request comprises the location assertion; obtaining, by the RDDS, the PII for the RDDS query; and providing, by the RDDS, a response to the RDDS query to the RDDS client, wherein the response comprises PII. In some examples, the PII is encrypted by the privacy provider. In some examples, the PII is encrypted by the RDDS.

According to examples of the present disclosure, a computer-implemented method for providing a registration data directory service (RDDS) is provided. The method comprises determining, by a hardware processor of a RDDS client, that options not covered by a RDDS protocol is needed for responding to a RDDS query; determining, by the hardware processor, one or more processing indictors for selective cryptographic processing to be put in a HTTP or a HTTPS request to the RDDS; determining, by the hardware processor, a mechanism to provide the one or more processing indicators to the RDDS; and providing, by the RDDS client, the HTTP or the HTTPS request to the RDDS.

According to some examples, a computer-implemented method for providing a registration data directory service (RDDS) is provided. The method comprises obtaining, by a RDDS server, a RDDS query from a RDDS client; determining, by a hardware processor of the RDDS server, that options not covered by a RDDS protocol is needed for responding to the RDDS query; determining, by the hardware processor, one or more processing indictors for options not covered by a RDDS protocol to be put in a HTTP or a HTTPS response to the RDDS client; determining, by the hardware processor, a mechanism to provide the one or more processing indicators to the RDDS client; and providing, by the RDDS server, the HTTP or the HTTPS response to the RDDS client.

In some examples, the one or more processing indicators identify selective encryption. In some examples, the one or more processing indicators identify encryption methods. In some examples, the one or more processing indicators identify decryption methods. In some examples, the one or more processing indicators identify personally identifying information (PII) processing methods. In some examples, the one or more processing indicators identify RDDS data selectively included or excluded. In some examples, the mechanism comprises formatting the one or more processing indicators in a HTTP header, or formatting the one or more processing indicators in a query portion of a URL, or formatting the one or more processing indicators in an authentication and/or an authorization token, or formatting the one or more processing indicators in an end-point of the URL.

It is to be understood that both the foregoing general description and the following detailed description are exemplary and explanatory only and are not restrictive of the implementations, as claimed.

DETAILED DESCRIPTION

Figure 1:
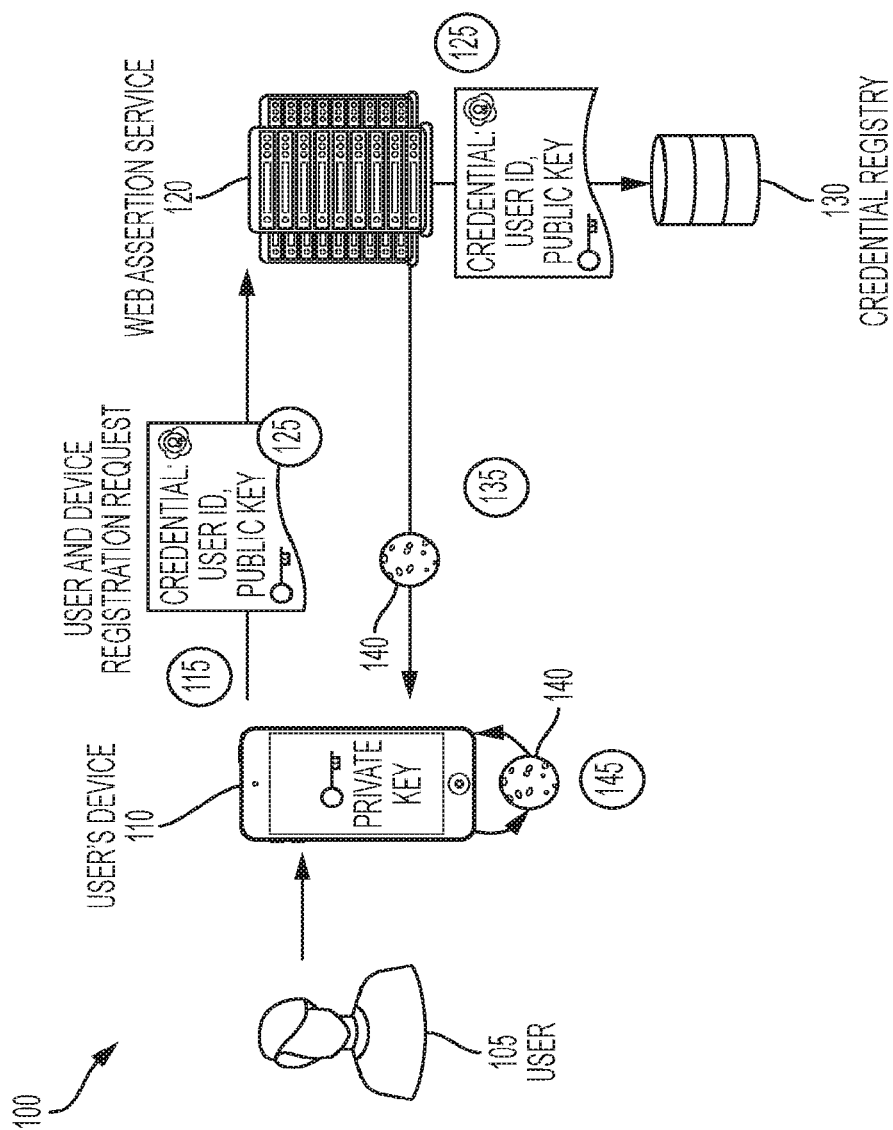
FIG. 1 is a hybrid flow diagram of a method 100 for registering a device that provides location assertions, according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Generally speaking, the present disclosure provides a full-circle solution for legally collecting, storing and distributing Personally Identifying Information ("PII"). This can be legally important to registries because thick WHOIS services and potentially future RDAP services (referred to by ICANN collectively as Registration Data Directory Services or RDDS) can have the potential for storing and exposing PII that is subject to jurisdictional law that limits PII exposure and constrains where the PII may be stored.

According to examples, a method and a system is provided for legally transmitting and exposing PII to a requesting entity. According to examples, a method and system is provided that addresses a generalized problem of how a requesting entity can provide options and assertions to a service through a channel independent of the request object and have service options that are performed by the service communicated back to the requestor through a channel that is independent of the response object and providing a mechanism for establishing the locale of a person supplying or requesting PII so that the locale can be used in determining the applicable legal jurisdiction for the transaction.

In examples of the present disclosure, the processing of the PII collection, storage and exposure by an RDDS includes one or more of the following. An RDDS collecting PII determines a person's location as part of identifying where PII can legally be collected and stored. The RDDS can use verifiable location assertions, e.g., location assertions, generated on a device in person's possession to determine person's location. The RDDS can assess location assertions as part of ensuring that PII is collected and stored in compliance with law applicable to person's location. An RDDS system may during generation of an RDDS response determine the location of a requesting entity to determine legal requirements relative to PII exposure to a requesting entity. The RDDS can use location assertions to determine requesting entity's location. The RDDS may only provide PII if requesting entity is legally allowed to see it. An RDDS can encrypt the PII to prevent exposure of the PII to transmission intermediaries, where the decryption key is not accessible to intermediaries. Responses may only be partially encrypted (e.g., just the PII is encrypted). An RDDS responding to request for PII may respond with contact information for a privacy provider rather than the PII for individuals associated with the response. A privacy provider can be a privacy service provided by a third party, a registrar, or a registry that is located in locality where it is legal to store PII. An entity issuing an RDDS request for PII may provide options with the request that specify how encryption should be performed including: encryption/decryption key determination; acceptable encryption algorithms; and full versus selective encryption of responses. The RDDS request can penetrate through privacy provider. An RDDS responding to a request for PII may provide indicators with the response that specify how PII was handled in the response including encryption details and details on any PII shielding (use of a privacy provider or not including PII in the response).

In examples of the present disclosure, a method for generation of verifiable location assertions can include one or more of the following features. Generally, the method begins with a user interacting with a device that generates location assertions. The device creates trusted and verifiable location assertions. A location assertion can be requested by an online service, such as a web WHOIS service, that needs to know a person's current location in order to apply locale specific processing. A location assertion can be requested by an authentication service or authorization service so that verifiable location claims can be put into a security token. A device providing a location assertion can be a mobile phone that has trusted device location services, such as an operating system provided GPS service. Trust that a specific device produced a location assertion is established by having a trusted location reporting application generate location assertions cryptographically signed with a private key unique to the device. Device/user/public key associations can be pre-registered with a service that will verify location assertions. A service needing a location assertion has the user interact with a trusted location reporting application running on a device.

In one example of establishing trust in a location reporting application is for the service to dynamically provide the location reporting application to the device and then verify that it is the provided location reporting application that produced the location assertion. The location reporting application may be provided to the device as JavaScript in a webpage. The origin of the location reporting application could be verified by the service by requiring the location reporting application to provide a cookie that the service put on the device during device registration. The location reporting application verifies the user is at the location of the device by performing user authentication on the device. This authentication process associates the user with the location of the device at the time of authentication. The location reporting application can disallow authentication by users who are using remote access into the device. The location reporting application determines current location using a trusted on-device location service. The location reporting application can determine current time using a trusted time service. The location reporting application generates and signs a location assertion using a private key available only to the device. Location assertions are sent from the device to the requesting service. An authentication or authorization service can use a location assertion in creating location claims in security tokens. In some examples, if the device has a TLS session active with the location service and the TLS session setup verified the devices public key, then the device is positively identified already and a separate step of signing the assertion is not required if some server generated information dynamically provided to the location reporting application, such as a nonce, is put into the assertion by the location reporting application.

Examples of the present disclosure provides mechanisms of producing verifiable location information by combining capabilities of mobile devices and assertion mechanisms. A mechanism is provided by which a signaling protocol can be implemented on top of an existing request/response protocol without need to modify the existing request/response protocol, and provides a flexible means for providing RDDS capability to meet PII exposure law around the globe including determination of legal jurisdiction and communication of processing options such as encryption mechanisms and chosen level of PII exposure.

In examples, PII collection and exposure can include one or more of the following features. For PII collection and storage, a person's location is identified to aid in determining the applicable jurisdictional law for collection and storage of person's PII. Jurisdictional law may determine the locale where it is legal to collect and store person's PII. For PII exposure, the location of an entity requesting PII must be identified to aid in determining legal restrictions on exposure of PII to the entity. To protect privacy and conform to privacy law, an entity being requested to expose PII: should not expose PII to entities residing in locations prohibited by applicable law; should protect transmitted PII from exposure to intermediate entities facilitating the transfer; and may choose to shield PII by providing contact information for a privacy provider rather than the PII of an individual.

In examples, the PII solution approach can include one or more of the following. An entity collecting PII determines person's location as part of identifying where PII can legally be collected and stored. The entity can use verifiable location assertions (location assertions) to determine person's location. The entity can assess location assertions as part of ensuring that PII is collected and stored in compliance with law applicable to person's location.

An entity may determine the location of a requesting entity to determine legal requirements relative to PII exposure to a requesting entity. Such an entity can use location assertions to determine requesting entity's location and may provide PII if requesting entity is legally allowed to see it. The entity providing PII to a requesting entity encrypts the PII to prevent exposure of the PII to transmission intermediaries where decryption key are not accessible to intermediaries, as described in U.S. patent application Ser. No. 15/452,997 file on Mar. 8, 2017 titled "GTLD Domain Name Registries RDAP Architecture," which is commonly owned with the present application and is hereby incorporated by reference in its entirety. Responses may only be partially encrypted (just the PII is encrypted). The entity responding to request for PII may respond with contact information for a privacy provider rather than the PII for individuals associated with the response.

An entity requesting PII may provide indicators with the request that specify how encryption should be performed including: encryption/decryption key determination; acceptable encryption algorithms; full versus selective encryption of responses. An entity responding to a request for PII may provide indicators with the response that specify how PII was handled in the response including encryption details and details on any PII shielding (use of a privacy provider or not including PII in the response).

Verifiable location assertions can be used by an online service that desires the current location of a person interacting with the service, which can be used to determine jurisdiction for applying legal requirements to interactions, such as legal requirements relative to PII and to support business processes that are aided by knowledge of the current location of the other party, such as tax collection. Such usage requires that a reported current location should be trusted. Trust is established if it can be verified that the reported location is provided by a trusted source, the reported location is current, and it can be verified that the person to whom the reported location applies is at the reported location.

In examples, the devices are registered with an assertion service so that the assertion service is able to tie the public key of a device to a device and user. Location assertions can be generated within the web browser on a registered device by a trusted location reporting application embedded in a web page provided by the assertion service to the registered device. The legitimacy of the location reporting application can be established by requiring the location reporting application to provide to the assertion service a cookie tied to the assertion service that provided the location reporting application to the web browser. The user is tied to the device by the location reporting application having the user authenticate with a trusted on-device authentication service. For example, user authentication can be provided by a one factor or multi-factor authentication technique including, but are not limited to, a password or biometric information (fingerprint, face identification, voice, etc.). The time of the location assertion is established by the location reporting application retrieving the current time from a trusted time service. The legitimacy of a location assertion is established by verifying a cryptographic signature on the location assertion that could only be produced using the private key of the registered device.

In some examples, a user may register multiple devices and choose the device to use for location verification as part of two-factor authentication. Device registration may require registration and verification of required device services: on-device location services and authentication services. A user might select from among several on-device authentication mechanisms and/or location services at time of location verification. For example, the authentication can be performed using a one-factor authentication, such as entering a password, a nonce, or using biometric information (e.g., fingerprint, voice print, etc.), or multi-factor authentication using more than one of the preceding examples, on the device.

A location reporting application may put claims in a location assertion to support assessment of the assertion. The claims can include one or more of the following: information about the on-device location service that was used, information about the type of on-device user authentication that was performed, or information to support assessment of whether or not the device could have been operated remotely during user authentication. A location assertion may encapsulate other assertions or be encapsulated in another assertion. The signature on an assertion encapsulating a location assertion may be considered as being the signature on the location assertion so long as the location reporting application trusts that the signature was created on-device with the private key of the device. Non-registered devices may be used for creating lower trust location assertions that are not tied to a registered identity. A non-registered device would provide its public key for use in verifying the signature on the location assertion.

X.509 certificates may be used for disclosing the public key of a device. An X.509 certificate provided by a device during TLS session setup may be the source for a device's public key. Verification of a device's public key might be accomplished via CA signature verification or DANE lookups.

FIG. 1 is a hybrid flow diagram of a method 100 for registering a device that provides location assertions, according to examples of the present disclosure. A user 105 using an on-device web browser on user's device 110, e.g., smart phone, initiates registration 115 with a web assertion service 120 and provides a credential 125 to use in the future for verifying location assertions from the user's device 110. The credential 125 includes the device's public key and a user ID that can be authenticated on-device. Registration information may be signed with the private key of the user's device 110. This allows web assertion service 120 to verify the supplied public key. Other verification techniques could be used, such as a challenge requiring a signed response from user's device 110 or having the web assertion service 120 request the X.509 certificate of user's device 110 during a TLS session setup. The web assertion service 120 stores the credential 125 in a credential registry 130. The web assertion service 120 provide, at 135, a cookie 140 associated with a service to the user's device 110, which is then stored, at 145, in the web browser. The cookie 140 provides a mechanism for the web assertion service 120 to ask the browser on the user's device 110 to store encrypted data on the user's device 110, which can only be retrieved by the web assertion service 120 based on the cookie 140 being bound to the domain name and "same origin policy" enforced by the browser such that only a location reporting application, discussed further below, from that domain can see the cookie. In some examples, the cookie 140 can include a nonce, e.g., a one-time use random or pseudo-random number used for authentication.

By providing the cookie 140 back to the web assertion service 120 along with the credential 125 (e.g., location assertion), the web assertion service 120 can have assurance that the webpage containing the location reporting application (e.g., JavaScript in the webpage) has not been compromised and the cookie is trusted due to be encrypted, TLS being used to encrypt communications with the server, and same origin policy enforced. A nonce (e.g., a random or pseudorandom number) that is changed as part of each location request can prevent or reduce the likelihood that a malicious use could attempt to do replay attacks. The web assertion service 120 can compare the nonce with the one it receives from the location reporting application to verify it is not being subject to a replay attack.

Figure 2:
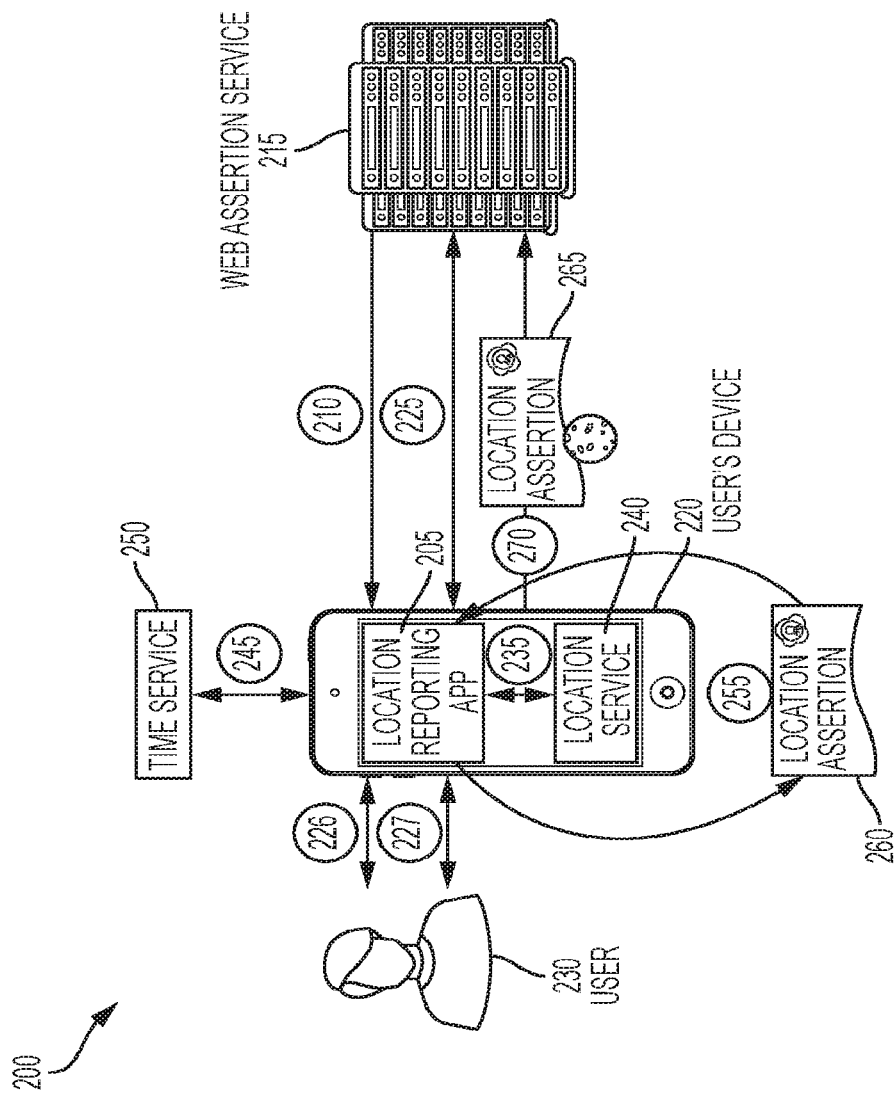
FIG. 2 is a hybrid flow diagram of a method 200 for location assertion generation, according to examples of the present disclosure.

FIG. 2 is a hybrid flow diagram of a method 200 for location assertion generation, according to examples of the present disclosure. At 226, a user 230 initiates an activity that needs a location assertion to be provided to the web assertion service 215 as part of fulfilling on the activity. The location reporting application 205 contained in a web page received, at 210, from a web assertion service 215 is initiated by a web browser on a user's device 220. Location reporting application 205 authenticates, at 225, 227, the user 230 using trusted on-device authentication service. Location reporting application 205 requests, at 235, a trusted location service 240 of the user's device 220 to provide current location. Location reporting application 205 requests, at 245, a trusted time service 250 to provide a current time. Location reporting application 205 generates and signs, at 255, a location assertion 260. Location assertion and cookie data 265 tied to the web assertion service 215 are provided, at 270, to the web assertion service 215 by the location reporting application 205.

Figure 3:
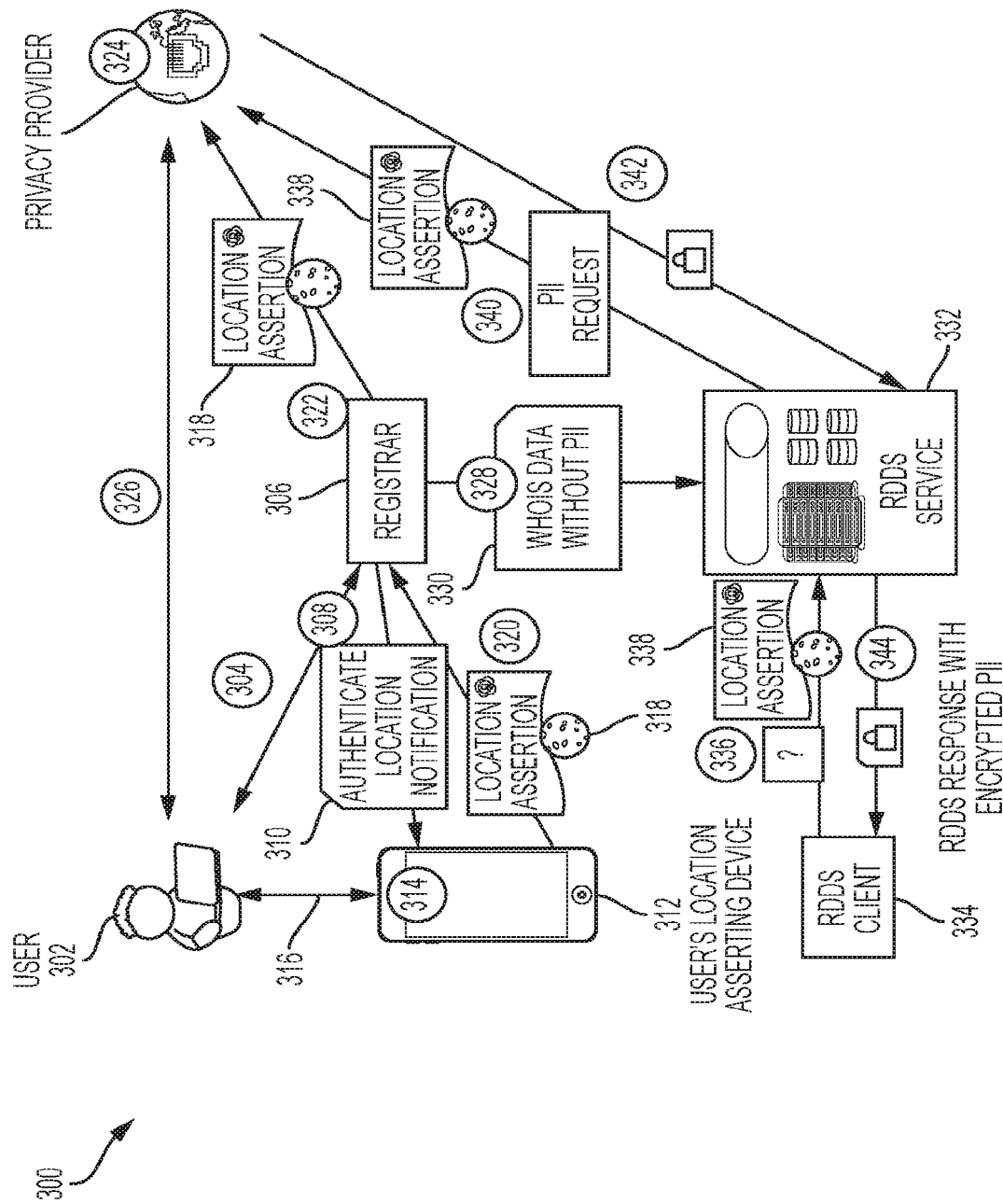
FIG. 3 is a hybrid flow diagram of a method 300 for RDDS use of location assertions in PII collection, storage and exposure, according to examples of the present disclosure.

FIG. 3 is a hybrid flow diagram of a method 300 for RDDS use of location assertions in PII collection, storage and exposure, according to examples of the present disclosure. A user 302 begins, at 304, a domain registration with a registrar 306. The registrar 306 requests, at 308, location assertion 310 from user's previously registered location asserting device 312. Location reporting application 314 on the location asserting device 312 authenticates the user 302 at 316 and produces a location assertion 318. The location assertion 318 is returned, at 320, to the registrar 306. The registrar 306 assesses the location assertion 318 and redirects, at 322, the user 302 to a privacy provider 324 for the location of the user 302 and includes the location assertion 318 on the redirect. The privacy provider 324 collects, at 326, and stores the PII for the user 302. The registrar 306 provides, at 328, WHOIS data without PII data 330 to a RDDS service 332. A RDDS client 334 provides, at 336, a location assertion 338 when querying the RDDS service 332. The RDDS service 332 may determine it needs PII to satisfy the query and includes the location assertion 338 when it requests, at 340, PII from the privacy provider 324. The privacy provider 324 assesses the request and the location assertion 338 from the RDDS service 332 to determine PII exposure requirements. The privacy provider 324 provides, at 342, either PII if legally allowable and encrypts it if legally required to do so, or may provide contact information of the privacy provider 324 as a shield on PII. The RDDS service 332 provides a response, at 344, which may contain PII which may be encrypted.

Figure 4:
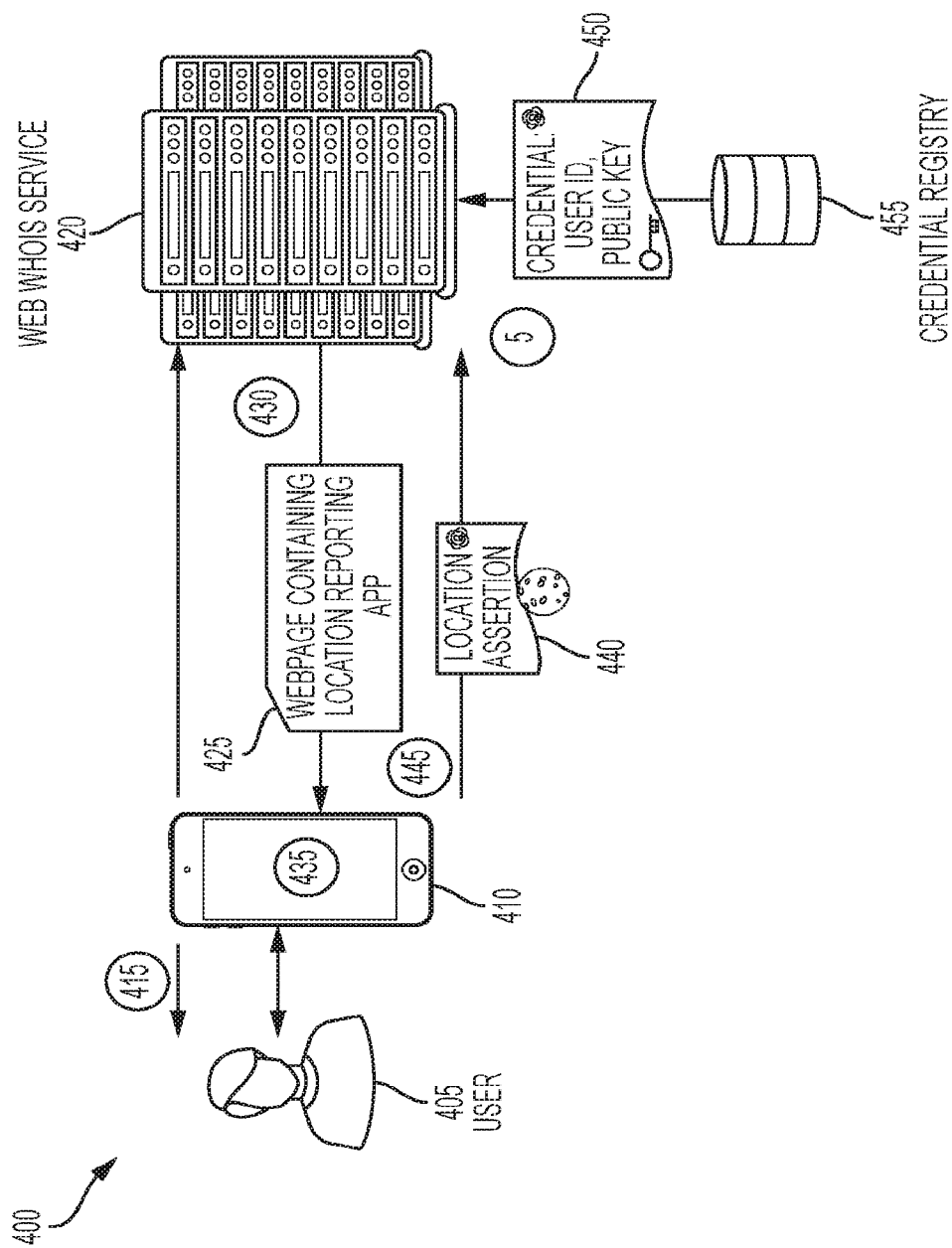
FIG. 4 is a hybrid flow diagram of a method 400 for a thick WHOIS service directly using location assertions, according to examples of the present disclosure.

FIG. 4 is a hybrid flow diagram of a method 400 for a thick WHOIS service directly using location assertions, according to examples of the present disclosure. A user 405 uses browser on a registered device 410 to initiate session, at 415, with a web WHOIS service 420. The web WHOIS service 420 includes a location reporting app 435 in web page 425 it sends, at 430, to the device 410. The location reporting application 435 performs processing necessary to produce a location assertion, described further in FIG. 5, including: authenticating user; getting location from trusted on-device location service; getting time from trusted time service; and signing location service with private key of device. The location assertion and cookie 440 associated with the web WHOIS service 420 is provided, at 445, to the web WHOIS service 420. The web WHOIS service 420 verifies location assertion by verifying the supplied cookie and verifying, at 450, the signature on the assertion using the registered public key of the device 410 provided from a credential registry 455.

Figure 5:
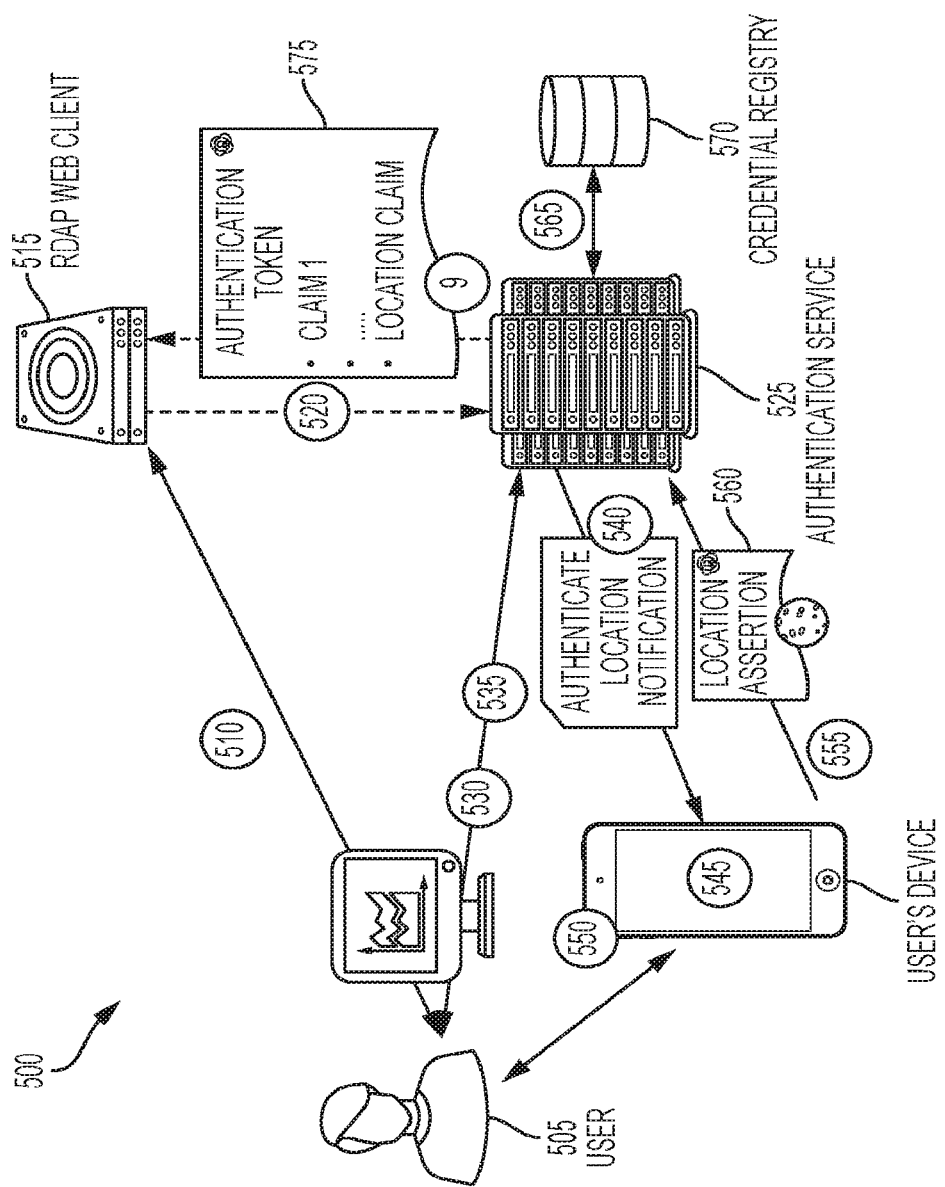
FIG. 5 is a hybrid flow diagram of a method 500 for a location assertion request inclusion in RDAP web client authentication, according to examples of the present disclosure.

FIG. 5 is a hybrid flow diagram of a method 500 for a location assertion request inclusion in RDAP web client authentication, according to examples of the present disclosure. A user 505 begins interacting, at 510, with an RDAP web client 515 that requires user authentication and a location claim. The RDAP web client 515 transfers control, at 520, through, for example a browser redirection process, to an authentication service 525. The user 505 begins interacting, at 530, with the authentication service 525. During an authentication flow, at 535, the user 505 identifies a device 545 to be used in generating a location assertion. The authentication service 525 sends, at 540, notification to the device 545 consisting of a URL of the authentication service 525 that can be used to launch a trusted location reporting application on the device 545. The location reporting application performs, at 550, processing necessary to produce a location assertion 560, as described in FIGS. 2-4. The location assertion 560 and cookie of authentication service are provided, at 555, to the authentication service 525. The authentication service 525 verifies, at 565, the cookie and device signature on the location assertion 560 using a credential registry 570 and puts the location assertion 560 into an authentication token 575. The authentication token 575 with a location claim is provided by the authentication service 525 to the requesting application or service.

Figure 6:
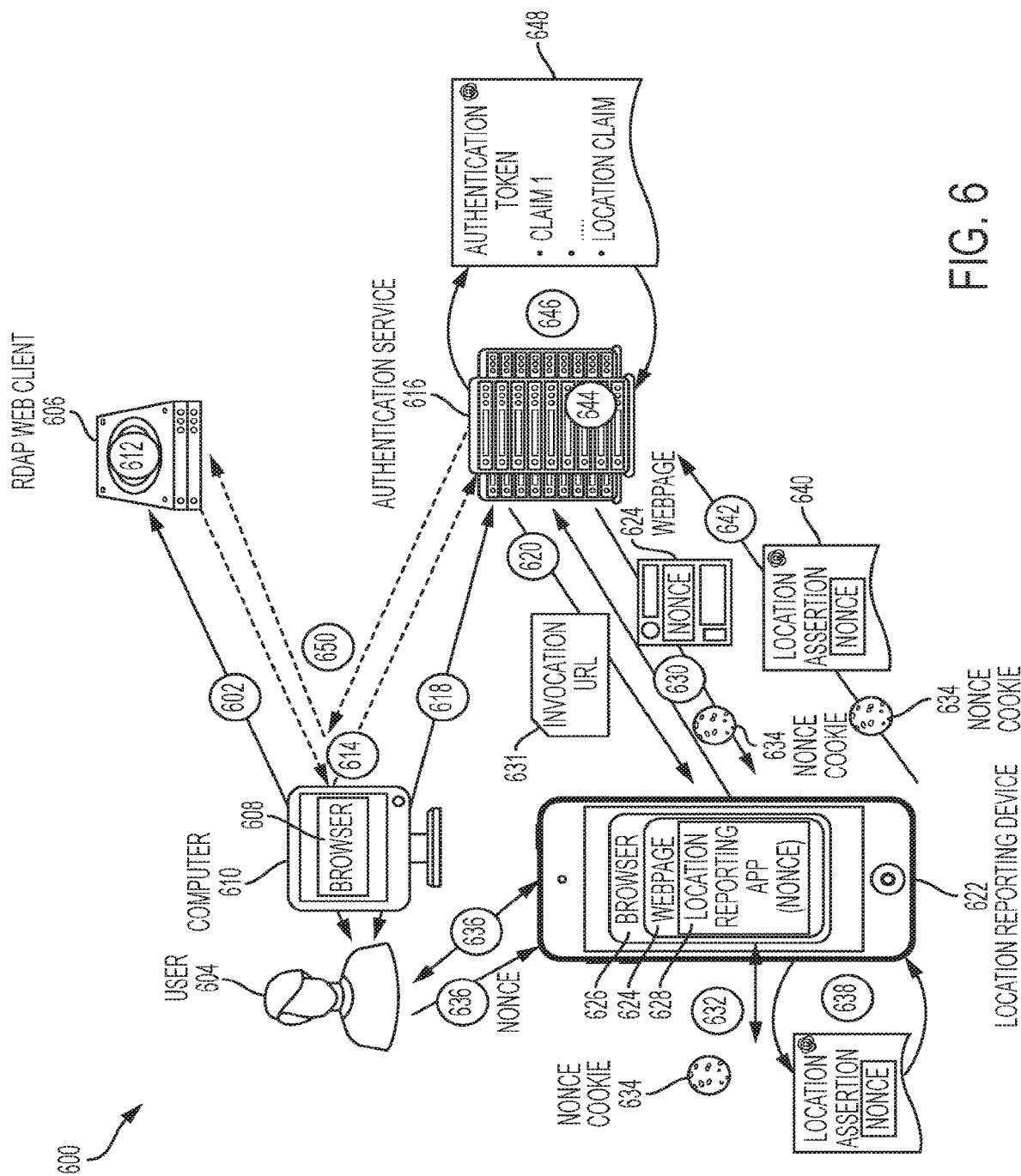
FIG. 6 is a hybrid flow diagram of a method 600 for user authentication with a nonce for a location reporting device, according to examples of the present disclosure.

FIG. 6 is a hybrid flow diagram of a method 600 for user authentication with a nonce for a location reporting device, according to examples of the present disclosure. At 602, user 604 initiates interaction with RDAP web client 606 from browser 608 on computer 610. At 612, RDAP web client 606 determines that user 604 authentication and location determination are needed. At 614, RDAP web client 606 redirects browser 608 on computer 610 to authentication service 616. At 618, authentication service 616 authenticates user 604 through an interaction via the browser 608 on the computer 610. At 620, authentication service 616 sends to the location reporting device 622 (via text message or email) an invocation URL for a webpage 624 on browser 626 containing the location reporting application 628. At 630, on the location reporting device 622, user 604 uses the supplied URL 631 from the authentication service 616 to retrieve the webpage 624 containing the location reporting application 628. At 632, authentication service 616 puts a nonce into the cookie 634 associated with the webpage 624 containing the location reporting application 628 and this is stored on the location reporting device 622 and also displays it in the webpage 624 presented to the user 604. At 636, the user 604 enters the value of the nonce into the webpage 628. At 638, the location reporting application 628 generates a location assertion 640 that includes the nonce entered by the user 604. At 642, the location assertion 640 is provided to the authentication service 616 along with the cookie 634. At 644, the authentication service 616 verifies the location assertion 640 including verifying that the nonce in the location assertion 640 matches the nonce in the cookie 634. At 646, the authentication service 616 generates an authentication token 648 that includes a location claim based on the location found in the location assertion 640 received from the location reporting device 622. At 650, authentication token 648 containing location claim is returned to the RDAP web client 606 via a redirect through the browser 608 on the computer 610.

Figure 7:
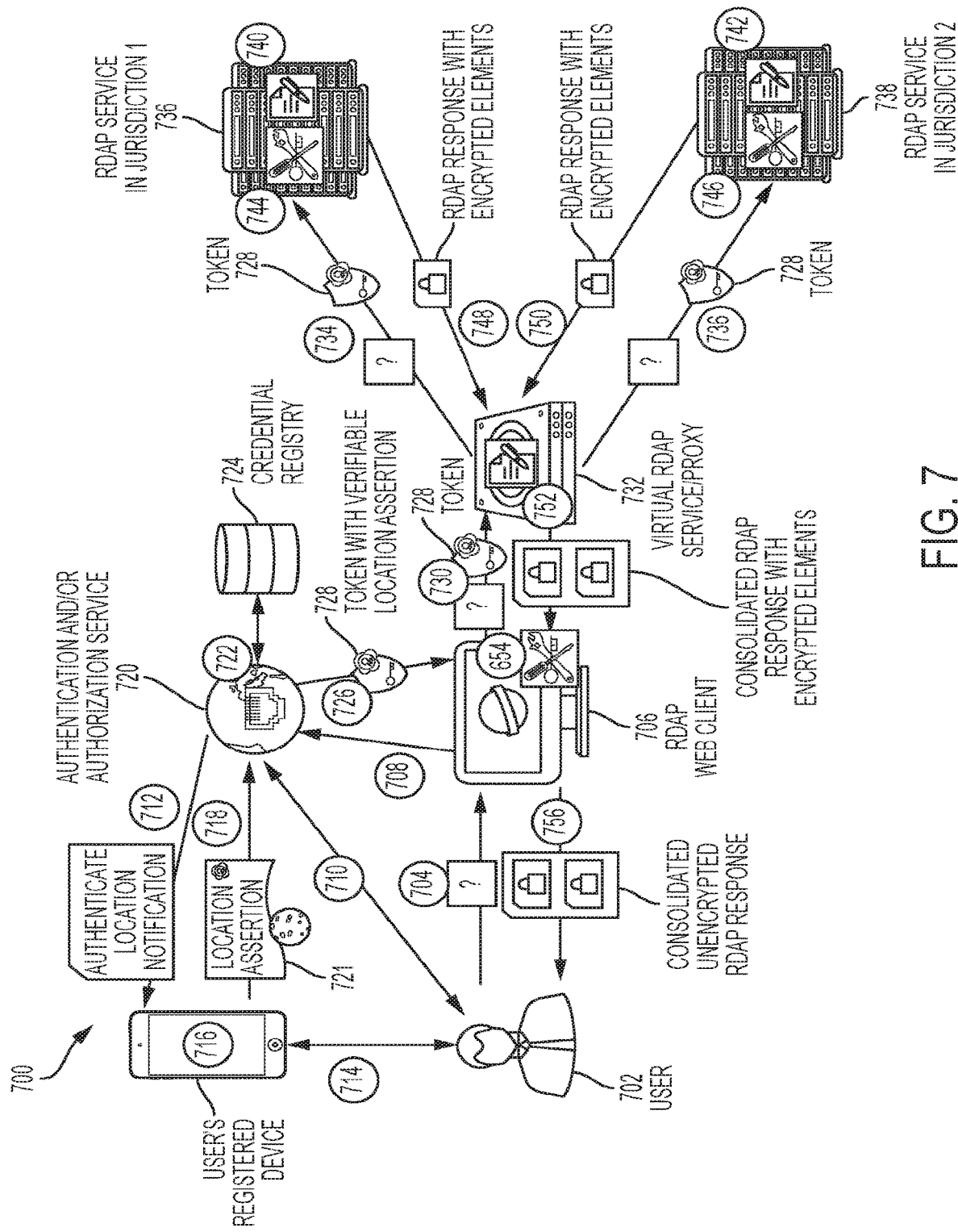
FIG. 7 is a hybrid flow diagram of a method 700 for selective encryption for virtual thick RDAP using verifiable location assertions, according to examples of the present disclosure.

FIG. 7 is a hybrid flow diagram of a method 700 for selective encryption for virtual thick RDAP using verifiable location assertions, according to examples of the present disclosure. A user 702 submits query, at 704, to a RDAP web client 706. The RDAP web client 706 redirects, at 708, to an authentication and/or authorization service 720. At 710, the authentication and/or authorization service 720 authenticates the user 702. At 712, the authentication and authorization service 720 sends authenticated location notification to a registered location verification device 716 of the user 702. A browser is launched and location verification script sourced from the authentication and/or authorization service 720 executes in the browser and use on-device authentication service to authenticate the user 702 at 614. The location verification script in the browser of the location verification device 716 uses a trusted device-resident location service and trusted time service to create location assertion and signs the assertion using the private key of the device 716. The location verification script in the browser of location verification device 716 provides, at 718, a signed location assertion 721 to the authentication and/or authorization service 720. The authentication and/or authorization service 720 also retrieves the cookie place on the device 716 during registration. The authentication and/or authorization service 720 verifies the device 716 signature on location assertion 721 and also verifies, at 722, that the cookie is the one it put on the device 716 during device registration (this proving that a webpage containing a location verification script came from the authentication and/or authorization service 720) using a credential registry 724. At 726, the authentication and/or authorization service 720 puts location assertion 718 into an authentication/authorization token 728 and returns this to the RDAP web client 706 via a redirect. At 730, a RDAP query and the token 728 containing location assertion are sent to a virtual thick RDAP service/proxy 732. At 734, the RDAP service/proxy 732 includes the token 728 containing the location assertion 721 queries a RDAP service 736. Similarly, at 736, the RDAP service/proxy 732 includes the token 728 containing the location assertion 721 queries a RDAP service 738. The RDAP service 736 is associated to a first jurisdiction, e.g., jurisdiction 1, and the RDAP service 738 is associated to a second jurisdiction, e.g., jurisdiction 2. The RDAP services 736, 738 assess the token 728 including the location assertion 721, at 740, 742, in determining exposure of PII and encryption options for PII included in RDAP responses. The RDAP services 736, 738 perform, at 744, 746, as-needed selected encryption as indicated by assessment of the token 728 and the location assertion 721 using either the public key of the RDAP web client 706 or a symmetric key known to the RDAP web client 706 and the RDAP services 736, 738, but not known to intermediaries such as the virtual RDAP service/proxy 732. RDAP responses, at 748, 750, possibly including selectively encrypted elements are returned to the virtual RDAP service/proxy 732. The virtual RDAP service/proxy 732 produces, at 752, consolidated RDAP response that will contain any selectively encrypted elements received from the RDAP services 736, 738, it sent queries too and returns response to the RDAP web client 706. At 755, the RDAP web client 706 decrypts selectively encrypted elements of consolidated RDAP response using either its private key or a symmetric key not known to intermediaries such as the virtual RDAP service/proxy 732, but which is known to the queried RDAP services 736, 738. At 756, the RDAP results are displayed to the user 702 by the RDAP web client 706.

In some examples, the notification to the device can include a nonce that is then entered by the user either on the device or into the user agent of the originating device as the means for authenticating the user. This allows for two-factor authentication using a separate registered device. The approach eliminates the need for on-device authentication if the user has already been authenticated by the RDAP web client as the device is implicitly authenticated when the notification is sent to it.

Figure 8:
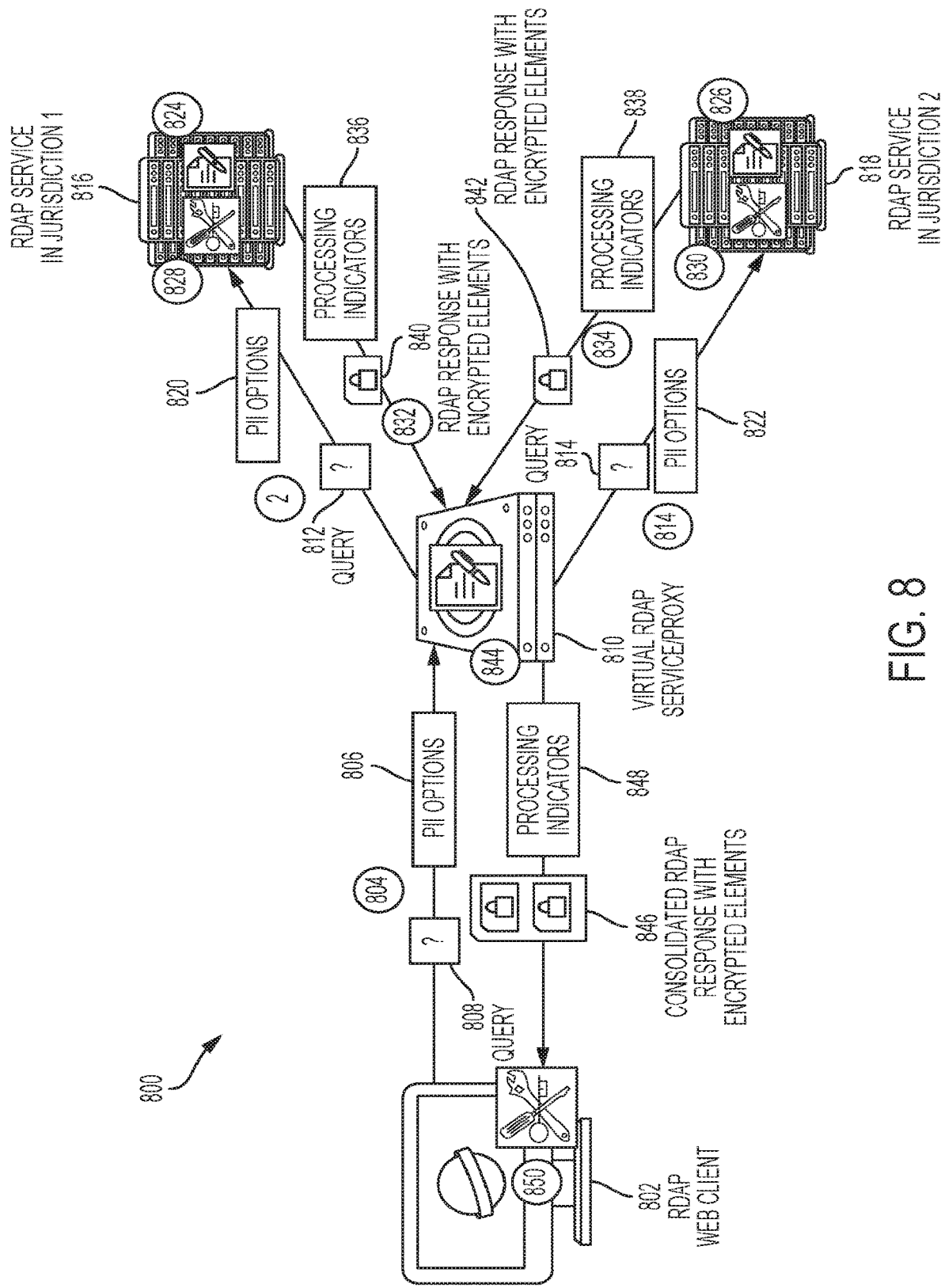
FIG. 8 is a hybrid flow diagram of a method 800 for signal-based selective PII exposure for virtual thick RDAP, according to examples of the present disclosure.

FIG. 8 is a hybrid flow diagram of a method 800 for signal-based selective PII exposure for virtual thick RDAP, according to examples of the present disclosure. A RDAP web client 802, provides, at 804, PII processing options 806 with RDAP query 808 to a virtual RDAP service/proxy 808. The PII processing options 806 can include directions for allowable PII processing functions, such as: exclude; encrypt based on taking into account recipient location; supported encryption methods; pierce privacy provider shield (if allowed). The PII processing options 806 can be transmitted in a number ways, such as: in the HTTP header; in the query portion of the URL; as claims in an authentication/authorization token; identified based on the end-point of the URL. The virtual RDAP service/proxy 810 sends RDAP queries 812, 814 to RDAP services 816 (jurisdiction 1), 818 (jurisdiction 2), respectively, and includes PII processing options 820, 822 with the queries 812, 814. At 824, 826, the RDAP services 816, 818 produce responses 826, 828 to the RDAP queries 812, 814. At 828, 830, the RDAP services 816, 818 assess PII processing options 820, 822 received with RDAP queries 812, 814 and perform identified processing in producing a response. The PII processing options can be communicated via some mechanism inherent in the underlying communication protocol, which allows for processing options to be exchanged without impacting the application level protocol (RDAP query and response specifications). For example, if PII processing options 820, 822 specify that PII elements be encrypted using either the public key of the RDAP web client 802 or a symmetric key known to the RDAP web client 802 and the RDAP services 816, 818, but not known to intermediaries such as the virtual RDAP service/proxy 810. At 832, 834, the RDAP responses 840, 842 that have taken into account requested PII processing options 820, 822 are returned to the virtual RDAP service/proxy 810 along with processing indicators 836, 838 indicating what processing options 820, 822 were performed. The returned processing indicators 836, 838 may include options that were not provided with the request, but which were determined independently by the RDAP services 816, 818. For example, a returned processing indicator might specify that PII encryption was performed to satisfy "Safe Harbor" requirements so that transmission intermediaries would not have access to the PII. In another example, the RDAP services 816, 818 may provide processing indicators containing identifiers for response elements that were encrypted. At 844, the virtual RDAP service/proxy 810 produces consolidated RDAP response 846 and returns the response to the RDAP web client 802 with an information indicating what processing options were performed 848. In some examples, the consolidated RDAP response 846 contains any selectively encrypted elements the virtual RDAP service/proxy 810 received from the RDAP services 816, 818 it queried and also returned with the response will be processing indicators identifying elements to which encryption was applied. At 850, the RDAP web client 802 takes into account any received processing indicators. For example, it may use the processing indicators to identify selectively encrypted elements of consolidated RDAP responses, and use other processing indicators to determine how to perform decryption. The identified decryption might identify whether the RDAP web client 802 should decrypt using its private key or may identify that the RDAP web client 802 should use a symmetric key not known to intermediaries such as the virtual RDAP service/proxy 810, but which is known to the queried RDAP services 816, 818.

In some examples, the RDDS client can decrypt the response as this shields the RDDS service from exposure to the PII if the RDDS service requested the PII from some downstream service that encrypted it using a key not known to the RDDS service.

Figure 9:
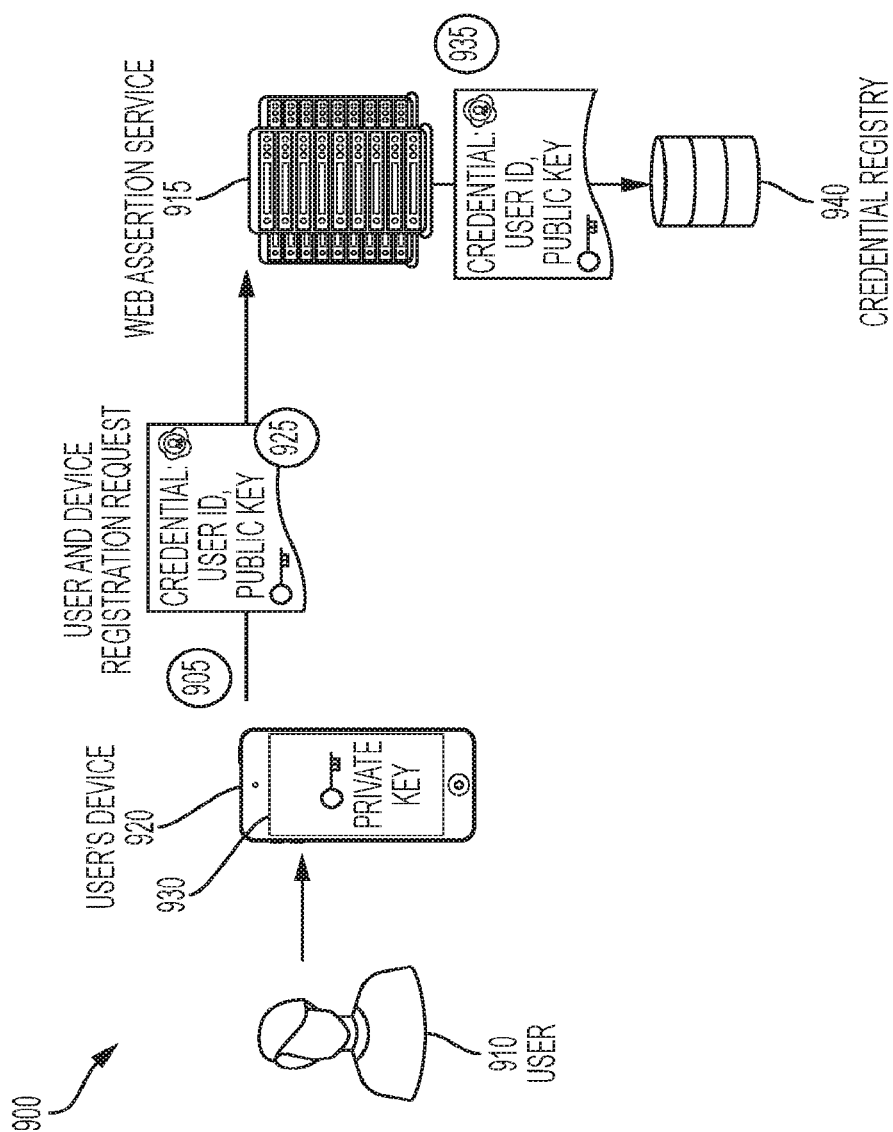
FIG. 9 is a hybrid flow diagram of another method 900 for registering a device that provides location assertions, according to examples of the present disclosure.

FIG. 9 is a hybrid flow diagram of another method 900 for registering a device that provides location assertions, according to examples of the present disclosure. At 905, a user 910 using an on-device web browser initiates registration with a web assertion service 915 and provides a credential to use in the future for verifying location assertions from a device 920. The credential includes the public key of the device 920 and an authenticated user ID. At 925, registration information may be signed with a private key 930 of the device 920. This allows the web assertion service 915 to verify the supplied public key. Other verification techniques could be used, such as a challenge requiring a signed response from the device 920 or having the web assertion service 915 request the device's X.509 certificate during a TLS session setup. At 935, the web assertion service 915 stores credential in a credential registry 940.

Figure 10:
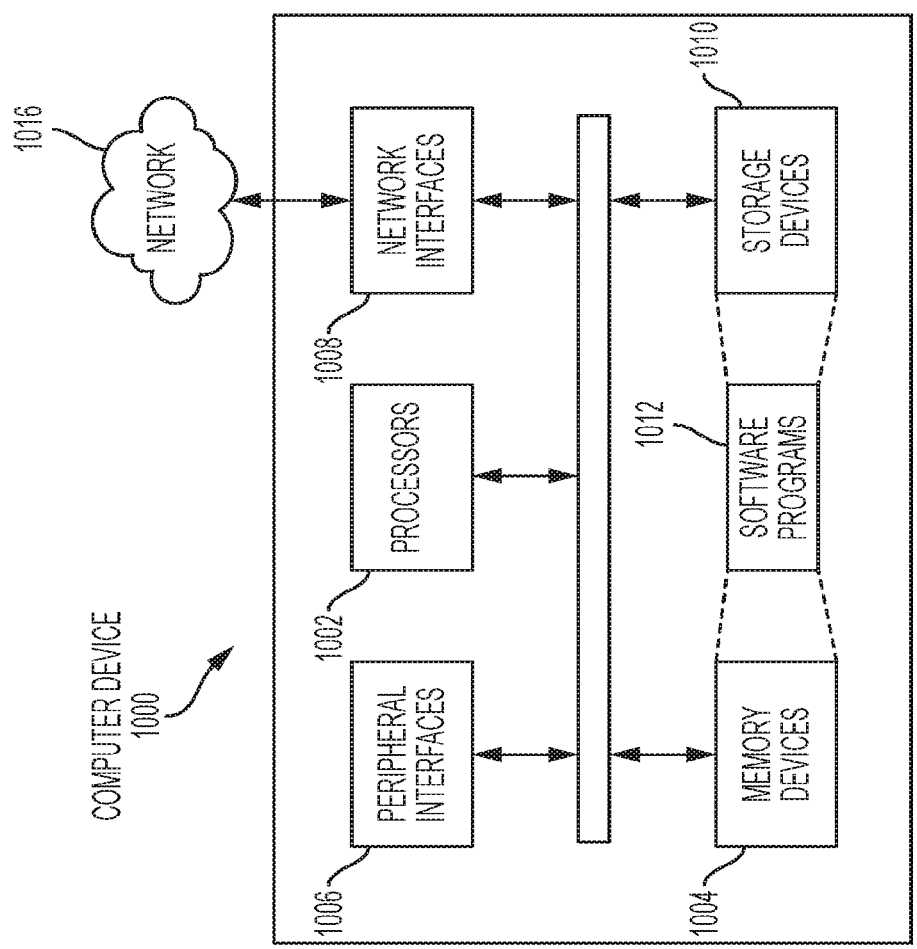
FIG. 10 is an example computer system for performing the disclosed implementations, consistent with the present disclosure.

FIG. 10 illustrates an example of a hardware configuration for a computer device 1000 that can be used as mobile device or server, which can be used to perform one or more of the DNS, RDDS, RDAP, and/or WHOIS processes and services described above. While FIG. 10 illustrates various components contained in the computer device 1000, FIG. 10 illustrates one example of a computer device and additional components can be added and existing components can be removed.

The computer device 1000 can be any type of computer devices, such as desktops, laptops, servers, etc., or mobile devices, such as smart telephones, tablet computers, cellular telephones, personal digital assistants, server(s) of the privacy provider, server(s) of the registrar, etc. As illustrated in FIG. 10, the computer device 1000 can include one or more processors 1002 of varying core configurations and clock frequencies. The computer device 1000 can also include one or more memory devices 1004 that serve as a main memory during the operation of the computer device 1000. For example, during operation, a copy of the software that supports the DNS, RDAP, RDDS, WHOIS and/or authentication operations can be stored in the one or more memory devices 1004. The computer device 1000 can also include one or more peripheral interfaces 1006, such as keyboards, mice, touchpads, computer screens, touchscreens, etc., for enabling human interaction with and manipulation of the computer device 1000.

The computer device 1000 can also include one or more network interfaces 1008 for communicating via one or more networks, such as Ethernet adapters, wireless transceivers, or serial network components, for communicating over wired or wireless media using protocols. The computer device 1000 can also include one or more storage device 1010 of varying physical dimensions and storage capacities, such as flash drives, hard drives, random access memory, etc., for storing data, such as images, files, and program instructions for execution by the one or more processors 1002.

Additionally, the computer device 1000 can include one or more software programs 1012 that enable the functionality described above. The one or more software programs 1012 can include instructions that cause the one or more processors 1002 to perform the processes described herein. Copies of the one or more software programs 1012 can be stored in the one or more memory devices 1004 and/or on in the one or more storage devices 1010. Likewise, the data, for example, the DNS, RDAP, RDDS, WHOIS and/or authentication data, utilized by one or more software programs 1012 can be stored in the one or more memory devices 1004 and/or on in the one or more storage devices 1010.

In implementations, the computer device 1000 can communicate with other devices via a network 1016. The other devices can be any types of devices as described above. The network 1016 can be any type of network, such as a local area network, a wide-area network, a virtual private network, the Internet, an intranet, an extranet, a public switched telephone network, an infrared network, a wireless network, and any combination thereof. The network 1016 can support communications using any of a variety of commercially-available protocols, such as TCP/IP, UDP, OSI, FTP, UPnP, NFS, CIFS, AppleTalk, and the like. The network 1016 can be, for example, a local area network, a wide-area network, a virtual private network, the Internet, an intranet, an extranet, a public switched telephone network, an infrared network, a wireless network, and any combination thereof.

The computer device 1000 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1000 as described above need not be enclosed within a single enclosure or even located in close proximity to one another. Those skilled in the art will appreciate that the above-described componentry are examples only, as the computer device 1000 can include any type of hardware componentry, including any necessary accompanying firmware or software, for performing the disclosed implementations. The computer device 1000 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure.

For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A computer-implemented method of generating a location assertion, the method comprising:
    obtaining, at a user device, a web page comprising a location reporting application from a web assertion service;
    activating the web page by a user action on a web browser stored on the user device;
    authenticating, by the location reporting application, the user;
    requesting, by the location reporting application, a current location using a trusted on-device location service;
    obtaining, by the location reporting application, the current location;
    requesting, by the location reporting application, a current time from a trusted time service;
    obtaining, by the location reporting application, the current time;
    generating, by the location reporting application, the location assertion, wherein the location assertion comprises information related to the current location and the current time;
    digitally signing, using a private key associated with a previously registered public key, by the location reporting application, the location assertion using a cryptographic digital signature protocol; and
    providing, by the location reporting application, the location assertion and a cryptographic credential.

2. The computer-implemented method of claim 1, prior to obtaining the web page, the method further comprises registering the user device that provides the location assertion by:
    loading a web browser on the user device; and
    directing the web browser to the web assertion service, wherein the web browser provides to the web assertion service a device registration request containing the cryptographic credential for verifying location assertions from the user device.

3. The computer-implemented method of claim 1, wherein the cryptographic credential comprises a user identifier and a public key associated with the user device, wherein the cryptographic credential is digitally signed with a private key that is associated with the public key.

4. The computer-implemented method of claim 1, wherein the cryptographic credential is a X.509 certificate.

5. The computer-implemented method of claim 1, wherein the user is authenticated using a trusted on-device authentication service.

6. The computer-implemented method of claim1, wherein the user is authenticated based on a nonce provided by the web assertion service.

7. The computer-implemented method of claim 1, wherein the user is authenticated based on a cookie provided by the web assertion service.

8. The computer-implemented method of claim 1, wherein the cryptographic credential comprises data related to a location assertion service that is provided by the web assertion service.

9. A computer device for generating a location assertion, the computer device comprising at least one processor configured to perform:
    obtaining, at a user device, a web page comprising a location reporting application from a web assertion service;
    activating the web page by a user action on a web browser stored on the user device;
    authenticating, by the location reporting application, the user;
    requesting, by the location reporting application, a current location using a trusted on- device location service;
    obtaining, by the location reporting application, the current location;
    requesting, by the location reporting application, a current time from a trusted time service;
    obtaining, by the location reporting application, the current time;
    generating, by the location reporting application, the location assertion, wherein the location assertion comprises information related to the current location and the current time;
    digitally signing, using a private key associated with a previously registered public key, by the location reporting application, the location assertion using a cryptographic digital signature protocol; and
    providing, by the location reporting application, the location assertion and a cryptographic credential.

10. The computer device of claim 9, wherein the at least one processor is further configured to perform:
    prior to obtaining the web page, registering the user device that provides the location assertion by:
        loading a web browser on the user device; and
        directing the web browser to the web assertion service, wherein the web browser provides to the web assertion service a device registration request containing the cryptographic credential for verifying location assertions from the user device.

11. The computer device of claim 9, wherein the cryptographic credential comprises a user identifier and a public key associated with the user device, wherein the cryptographic credential is digitally signed with a private key that is associated with the public key.

12. The computer device of claim 9, wherein the cryptographic credential is a X.509 certificate.

13. The computer device of claim 9, wherein the user is authenticated using a trusted on-device authentication service.

14. The computer device of claim 9, wherein the user is authenticated based on a nonce provided by the web assertion service.

15. The computer device of claim 9, wherein the user is authenticated based on a cookie provided by the web assertion service.

16. The computer device of claim 9, wherein the cryptographic credential comprises data related to a location assertion service that is provided by the web assertion service.

17. A non-transitory computer-readable medium comprising computer readable instructions for generating a location assertion by configuring at least one processor to perform operations comprising:

obtaining, at a user device, a web page comprising a location reporting application from a web assertion service;

activating the web page by a user action on a web browser stored on the user device;

authenticating, by the location reporting application, the user;

requesting, by the location reporting application, a current location using a trusted on-device location service;

obtaining, by the location reporting application, the current location;

requesting, by the location reporting application, a current time from a trusted time service;

obtaining, by the location reporting application, the current time;

generating, by the location reporting application, the location assertion, wherein the location assertion comprises information related to the current location and the current time;

digitally signing, using a private key associated with a previously registered public key, by the location reporting application, the location assertion using a cryptographic digital signature protocol; and providing, by the location reporting application, the location assertion and a cryptographic credential.

18. The non-transitory computer-readable medium of claim 17, wherein the operations further comprise: prior to obtaining the web page, registering the user device that provides the location assertion by: loading a web browser on the user device; and directing the web browser to the web assertion service, wherein the web browser provides to the web assertion service a device registration request containing the cryptographic credential for verifying location assertions from the user device.

19. The non-transitory computer-readable medium of claim 17, wherein the cryptographic credential comprises a user identifier and a public key associated with the user device, wherein the cryptographic credential is digitally signed with a private key that is associated with the public key.

20. The non-transitory computer-readable medium of claim 17, wherein the cryptographic credential is a X.509 certificate.

21. The non-transitory computer-readable medium of claim 17, wherein the user is authenticated using a trusted on-device authentication service.

22. The non-transitory computer-readable medium of claim 17, wherein the user is authenticated based on a nonce provided by the web assertion service.

23. The non-transitory computer-readable medium of claim 17, wherein the user is authenticated based on a cookie provided by the web assertion service.

24. The non-transitory computer-readable medium of claim 17, wherein the cryptographic credential comprises data related to a location assertion service that is provided by the web assertion service.

* * * * *